United States Patent
Hahn et al.

(10) Patent No.: US 6,352,427 B1
(45) Date of Patent: Mar. 5, 2002

(54) MULTI-SHOT INJECTION MOLDING ARRANGEMENT

(75) Inventors: John J. Hahn, Hartford; Steven P. Kolander, West Allis; Mark G. Sellers, Hartland; Michael E. Ebenhoe, Menomonee Falls, all of WI (US)

(73) Assignee: MGS Mfg. Group, Inc., Germantown, WI (US)

( * ) Notice: Subject to any disclaimer, the term of this patent is extended or adjusted under 35 U.S.C. 154(b) by 0 days.

(21) Appl. No.: 09/543,805

(22) Filed: Apr. 6, 2000

(51) Int. Cl.[7] ............................................. B29C 45/07
(52) U.S. Cl. .................................. 425/574; 264/328.11
(58) Field of Search ...................... 425/574; 264/328.11

(56) References Cited

U.S. PATENT DOCUMENTS

| | | | | |
|---|---|---|---|---|
| 4,863,368 A | * | 9/1989 | Hehl | 425/574 |
| 5,183,621 A | * | 2/1993 | Yukihiro et al. | 425/574 |
| 5,443,378 A | * | 8/1995 | Jaroschek et al. | 425/574 |

* cited by examiner

*Primary Examiner*—Tim Heitbrink
(74) *Attorney, Agent, or Firm*—Quarles & Brady LLP (57) ABSTRACT

An injection molding apparatus includes a fixed injection molding machine having a housing, a first injection molding unit and a die associated therewith. A portable framework is removably attached to the molding machine housing and has at least a second injection machine molding unit operably aligned with the molding machine die and cooperable with the first injection molding unit.

12 Claims, 7 Drawing Sheets

MULTI-SHOT INJECTION MOLDING ARRANGEMENT

FIELD OF THE INVENTION

This invention relates broadly to thermoplastic injection molding apparatus and, more particularly, pertains to the enhancement of a commercially available injection molding machine to increase production capability.

BACKGROUND OF THE INVENTION

Changes in plastics manufacturing strategies, particularly the growing emphasis on reducing in-process time and inventories, make multi-shot molding more viable and cost justifiable than single shot molding for a broader range of manufacturers. The multi-shot process allows multiple colors or materials to be sequentially injected in a single, continuous process to speed throughput, minimize production and assembly operations, improve part quality and create innovative part features. In most cases, a single injection molding machine with multiple injection units will generally cost less than an equivalent number of machines with single injection units. Likewise, a single two-color mold will usually cost less than two one-color molds. Because only a single machine operator is required for a multi-step process, there is a labor savings realized which can have major impact on payback calculations and life cycle costs. Floor space, electricity, and other utility costs are also reduced by consolidating operations on one machine. Faster inventory turns for savings on in-process inventory can be a critical factor in the decision matrix as well.

Despite their advantages, multi-shot injection molding machines are not readily available from the inventory from large press manufacturers and must often be custom built which results in several months of delay before the desired production can commence. Once the multi-shot machine is delivered and installed, the customer is locked into the particular design and location of the multiple injection units on a particular manufacturer's machine. There is no adjustability of the injection unit along the x and y axis, nor is there any interchangeability with another press manufacturer's machine or parts thereof.

Accordingly, it is desirable to provide an arrangement for removably mounting an injection molding unit on a commercially available injection molding machine in a manner which will produce all the advantages of a multi-shot machine without any of its drawbacks. It is also desirable to provide a universally applicable framework for marrying at least one molding unit into the existing die of a standard injection molding machine.

SUMMARY OF THE INVENTION

It is a general object of the present invention to transform a known single shot molding machine into a multi-shot molding machine.

It is one object of the present invention to provide a portable injection molding unit for expanding the flexibility of a standard injection molding machine.

It is another object of the present invention to efficiently provide a rail mounted injection molding unit which is adjustable along three axes of movement relative to a fixed injection molding machine.

It is a further object of the present invention to provide an injection molding conversion arrangement which can be adapted for use on variously manufactured injection molding machines.

It is an additional object of the present invention to provide alternative multi-shot molding without requiring a custom built injection molding machine.

In one aspect of the invention, an injection molding machine having a die is improved such that an injection molding arrangement is removably mounted to the injection molding machine and cooperates with the die thereof to increase the molding capability of the machine. The injection molding arrangement includes an injection barrel which is adjustable along three axes relative to the injection molding machine. The injection molding arrangement is transferable from the injection molding machine to another injection molding machine. The injection molding arrangement includes rail structure engageable with bearing structure enabling movement of the injection molding unit longitudinally and laterally of the injection molding machine. The injection molding arrangement is comprised of at least one injection molding unit removably mounted to the injection molding machine.

In another aspect of the invention, an injection molding apparatus includes a fixed, injection molding machine having a housing, a first injection molding unit and a die associated therewith. A portable framework is removably mounted to the molding machine housing and has at least a second injection molding unit operably aligned with the molding machine die and cooperable with the first injection molding unit. The framework includes a base plate fixed to the molding machine housing, and a pair of parallel side panels slidably mounted on the base plate and interconnected by cross member structure. The second injection molding unit is slidably mounted on the cross member structure. A first adjustment device is disposed between one of the side panels and the base plate for enabling sliding movement of the side panels, cross member structure and second injection molding unit relative to the base plate. A second adjustment device is disposed between the side panels for providing sliding movement of the second injection molding unit relative to the side panels and base plate. One of the adjustment devices provides movement longitudinally of the molding machine housing and the other of the adjustment devices provides movement laterally of the molding machine housing. A first set of linear bearings is interposed between the side panels and the base plate. A second set of linear bearings is interposed between the cross member structure and a mounting block structure of the second injection molding unit. The side panels have bottom rails defining a longitudinal set of rails. The cross member structure has top portions defining a latitudinal set of rails. The mounting block structure includes a pair of mounting blocks interconnected by a tie bar. The first adjustment device includes a longitudinal lead screw, and the second adjustment device includes a latitudinal lead screw. The second injection molding unit has an injector barrel which is adjustable along three different axes of movement relative to the molding machine housing.

In yet another aspect of the invention, there is contemplated a method of providing multi-shot molding capability in the production of plastic-based components. The method includes the steps of providing a fixed injection molding machine having a housing, a first injection molding unit and a die associated therewith; disposing a portable framework having at least a second injection molding unit upon the molding machine housing such that the second injection molding unit is operably aligned with the die in cooperation with the first injection molding unit; and removably fastening the framework to the molding machine housing.

Various other features, objects and advantages of the invention will be made apparent from the following description taken together with the drawings.

BRIEF DESCRIPTION OF THE DRAWINGS

The invention will become better understood by reference to the following detailed description of the preferred exemplary embodiment when read in conjunction with the appended drawing, wherein like numerals denote like elements and.

DETAILED DESCRIPTION OF THE INVENTION

Referring now to FIGS. 1–4, the reference numeral 10 generally designates a portable injection molding arrangement which is removably mounted on an upper housing portion 12 of a fixed, standard or commercially available injection molding machine 14. As is well known, machine 14 includes at least one injection molding unit 16 which cooperates with a die 18 and injects heated pellets into a mold to produce plastic products of a desired structure. Such machines equipped with one injection molding unit 16 are referred to as single shot molding machines. As explained in the Background of the Invention, single shot molding machines are limited in their production capability and are being upstaged by multi-shot machines which are usually custom built by large press manufacturers.

The present invention converts or transforms the standard molding machine 14 into a two-shot or multi-shot machine, by means of a unique mounting arrangement, in a shorter period of time and without the enormous cost and long wait of a specially manufactured machine.

Figure 1:
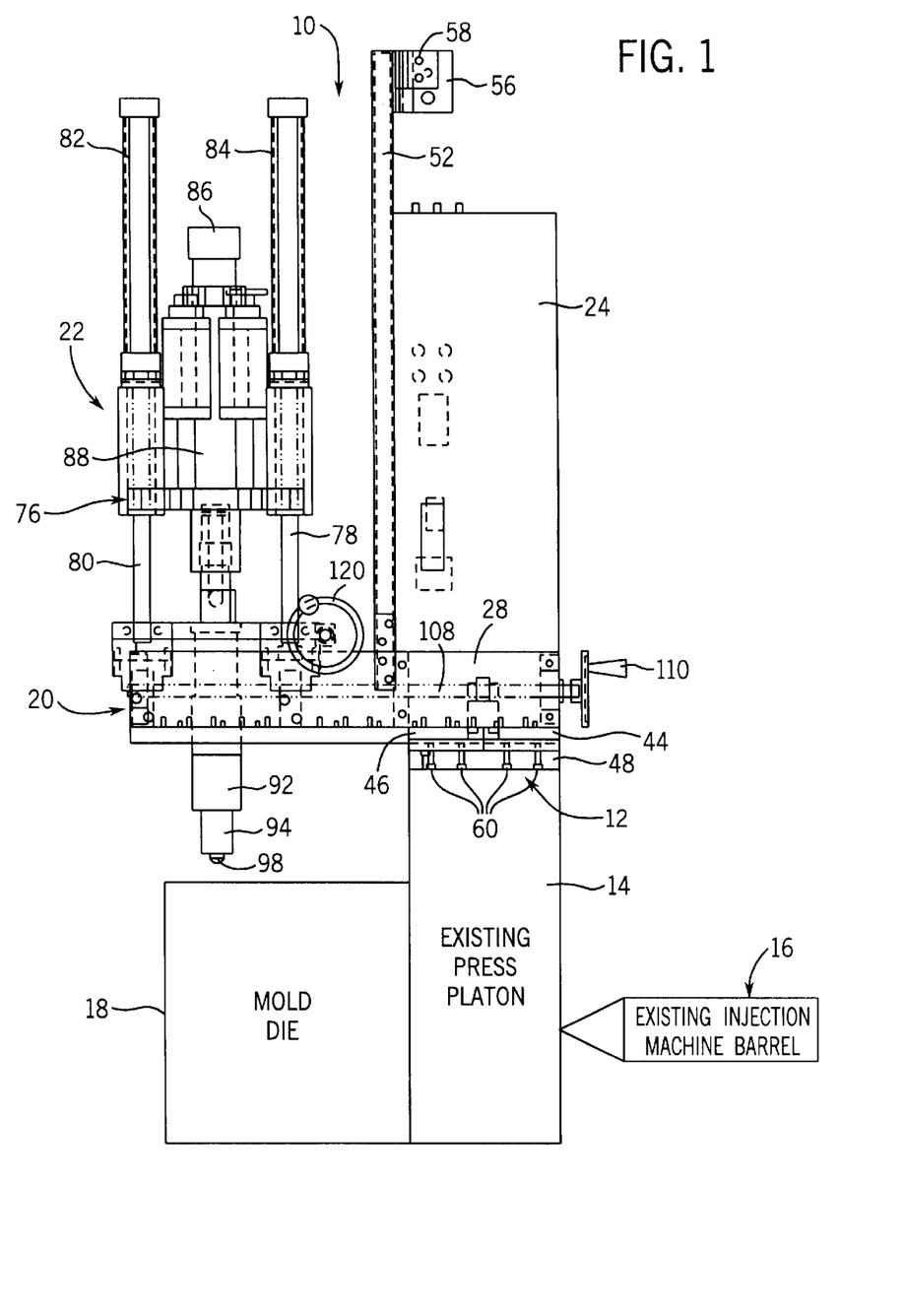
FIG. 1 is an elevational view of a portable injection molding arrangement removably mounted to an injection molding machine in accordance with the invention.
Figure 2A:
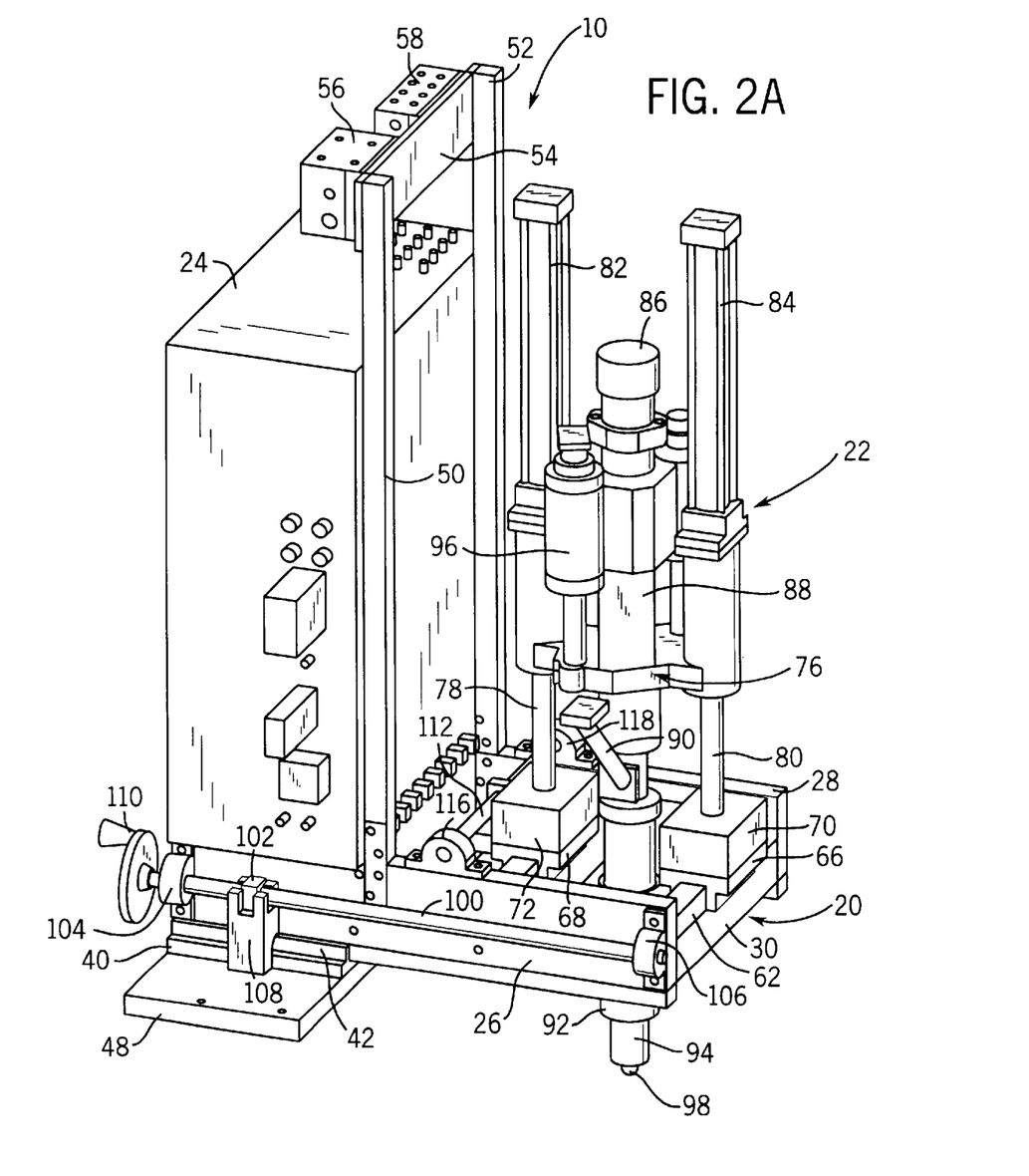
FIG. 2A is a left side perspective view of a portable injection molding arrangement removably mounted to a standard injection molding machine in accordance with the invention.
Figure 2B:
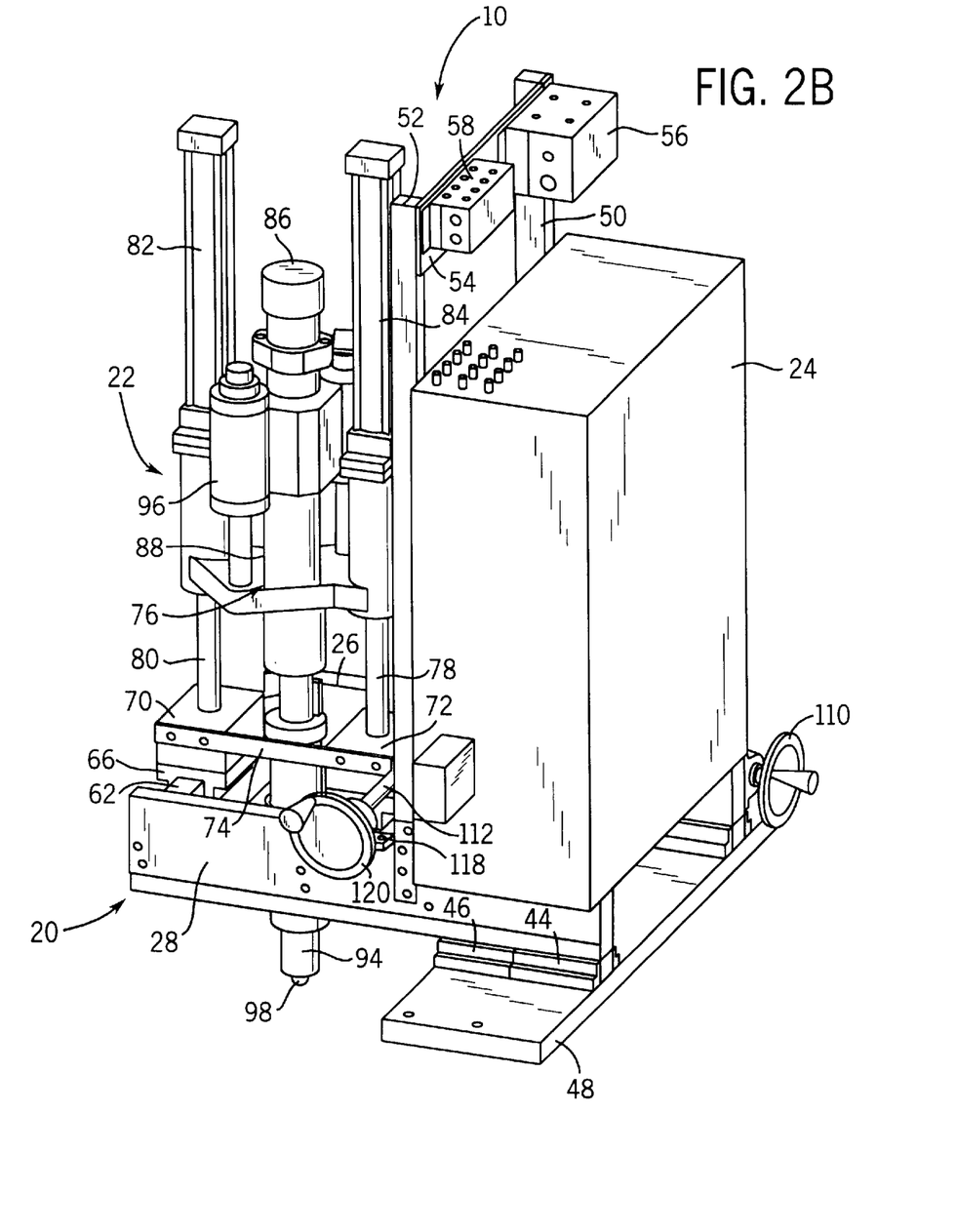
FIG. 2B is a right side perspective view of the arrangement shown in FIG. 1.
Figure 3:
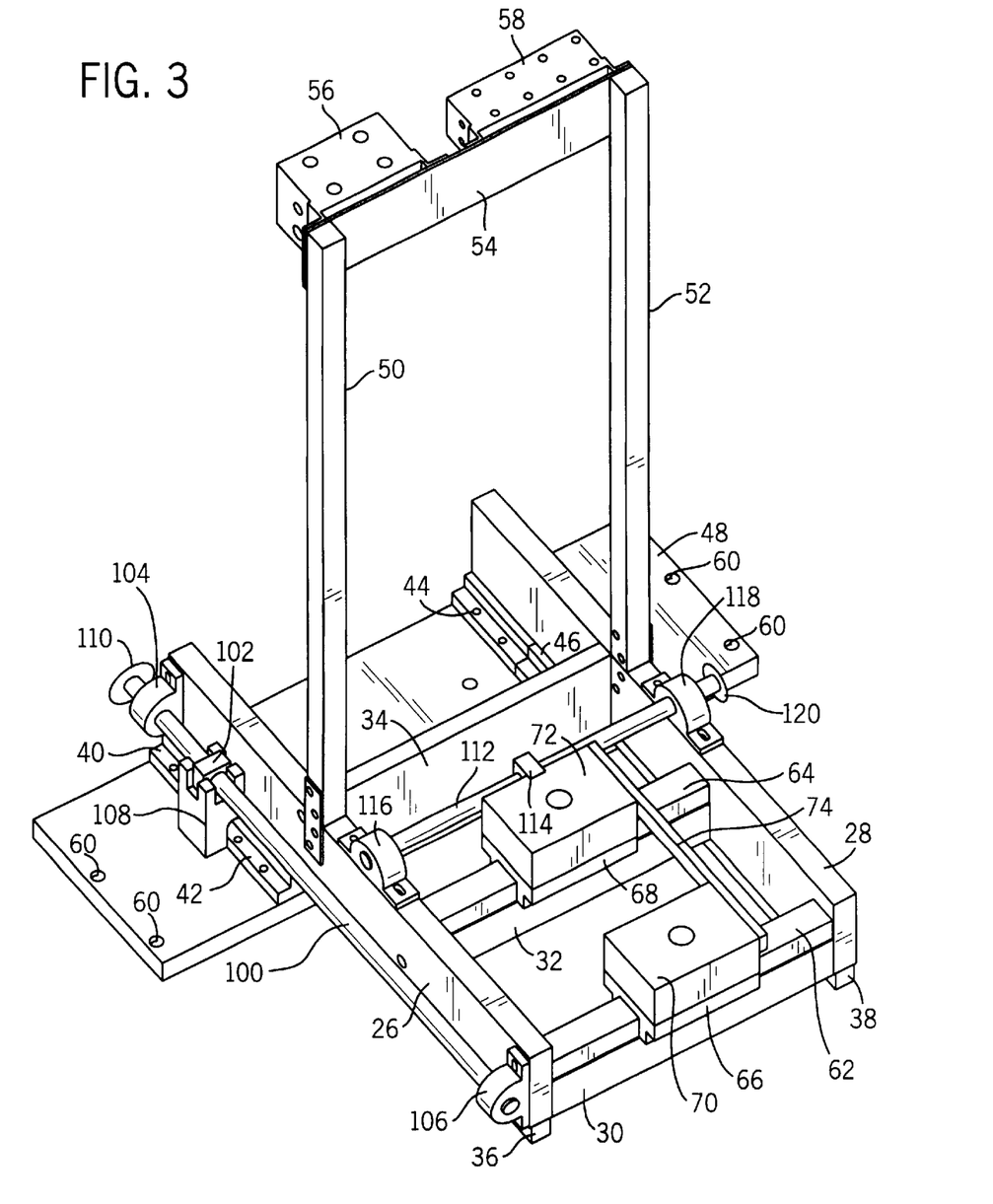
FIG. 3 is a left side perspective view of the framework in the arrangement with various components removed for clarity.
Figure 4:
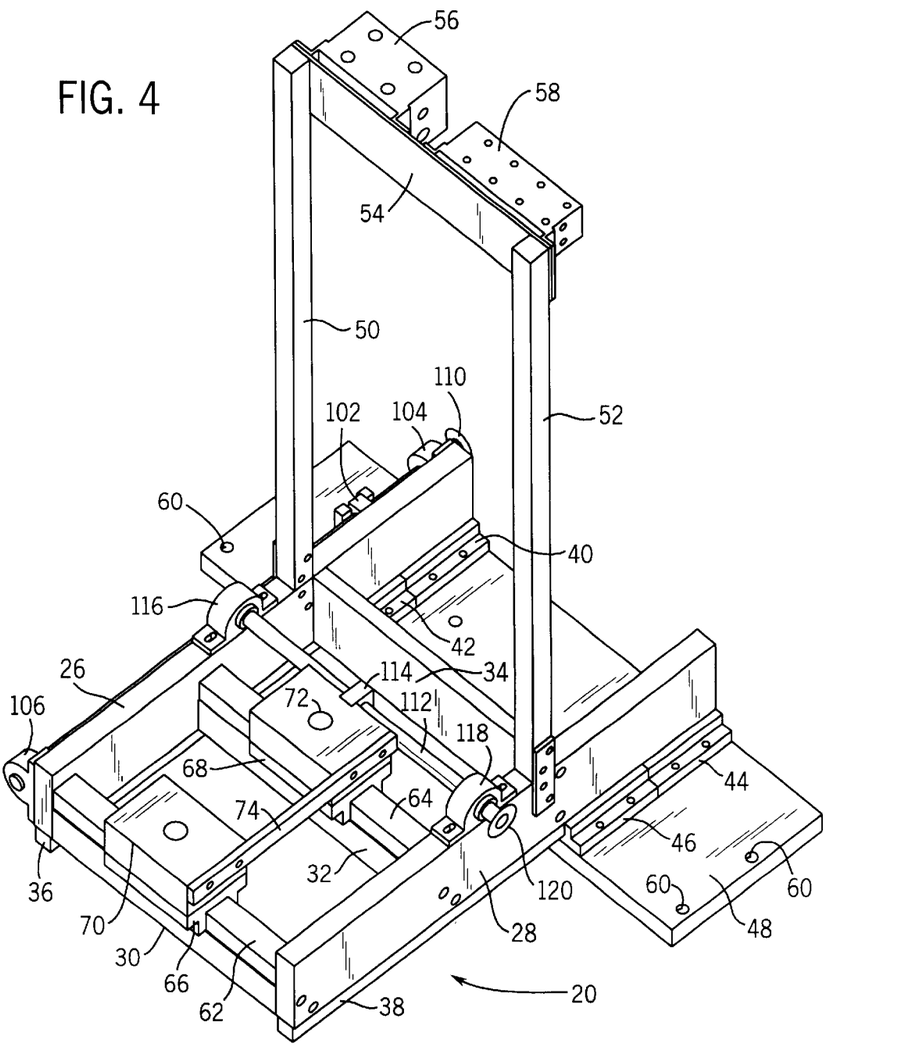
FIG. 4 is a right side perspective view of the framework shown in FIG. 3.

The portable arrangement 10 is characterized by a framework 20 for adjustably supporting at least one commonly-purchased injection molding unit 22 and an enclosure 24 for housing the various electrical controls therefor. As seen in FIGS. 3 and 4, framework 20 includes a pair of parallel side panels 26,28 interconnected by a front cross member 30, an intermediate cross member 32 and a transverse support wall 34. The bottom portions of the side panels 26,28 define respective longitudinal rails 36,38 which are slidably mounted in a set of four longitudinal linear bearings 40,42, 44,46 anchored to a rectangular base plate 48. Extending vertically upward from the side panels 26,28 immediately adjacent the support wall 34 is a pair of parallel uprights 50,52. A cross piece 54 joins the uprights 50,52 at their upper ends and supports a pair of hydraulic manifolds 56,58 associated with the injection molding unit 22. The electrical enclosure 24 is seated on the rear portions and top edges of the side panels 26,28 and behind the uprights 50,52. It should be noted that the entire arrangement 10 is conveniently adapted to the standard molding machine 14 by removably securing the base plate 48, such as by fasteners 60, to the upper housing portion 12. It should also be appreciated that base plate 48 spans the width of the framework 20, and extends beyond the side panels 26,28 in order to provide stability to the add-on equipment.

The top portions of the front cross member 30 and intermediate cross member 32 form respective latitudinal rails 62,64 upon which a pair of respective latitudinal linear bearings 66,68 are slidably mounted. The bearings 66,68 underlie the injection molding unit 22 which includes a pair of hydraulic cylinder mounting blocks 70,72 coupled together by a tie bar 74 for a purpose to be more appreciated hereafter. The mounting blocks 70,72 support a main casting 76 movable upwardly and downwardly along respective cylinder rods 78,80 of a pair of carriage cylinders 82,84. The casting 76 includes a hydraulic motor 86 for driving an injection screw 88 used to deliver thermoplastic pellets through a hopper feed throat 90 to the heater bands 92 of an injection barrel 94. Heated flowable plastic is periodically injected or "shot" by means of an injection cylinder 96 from a nozzle tip 98 which is directed to the die 18 in the molding machine 14. This additional "shot" supplied by arrangement 10 cooperates with the shot provided by the standard machine 14 to create a multi-shot machine having multi-color/material molding capability with more features, better quality and less cost than when using separate single shot machines.

A salient feature of the present invention resides in the adjustability of the injection barrel 94 along three (x, y and z) axes relative to the molding machine 14. As described above, movement of the injection barrel 94 along a vertical or z-axis is provided by means of the carriage cylinders 82,84. To enable adjustment along an x-axis or longitudinally of the machine 14, a longitudinal lead screw 100 having a nut 102 fixed thereto is threadedly received in a pair of pillow block bearings 104,106 joined to the side panel 26. The nut 102 is captured in a support block 108 which is connected to the side panel 26 and slides on the linear bearings 40,42. Because the side panels 26,28 are joined together, turning a handle 110 on lead screw 100 will move the side panels 26,28 and the remainder of framework 20 supporting injection barrel 94 forwardly and rearwardly in a horizontal plane parallel to the upper housing portion 12. To enable adjustment along a y-axis or laterally of the machine 14, a latitudinal lead screw 112 having a nut 114 fixed thereon is threadedly received in a pair of pillow block bearings 116,118 mounted on the top edges of side panels 26,28. The nut 114 is joined directly with the mounting block 72 which is slidably mounted on rail 64. Because the mounting blocks 70,72 are linked together by tie bar 74, turning of a handle 120 on lead screw 112 will cause the mounting blocks 70,72 and the injection molding unit 22 including the injection barrel 74 to traverse from side-to-side in a horizontal plane parallel to its upper housing portion 12.

When it is desired to enhance the molding capability of an existing molding machine 14, a crane is used to lift the portable injection molding arrangement 10 to a flat plane of the upper housing portion 12, and dispose the injection barrel 94 over the die 18 of the machine 14. The entire framework 20 is lowered so that the base plate 48 lies flush on the upper housing portion 12, after which fasteners 60 are used to secure the base plate 48 to the housing of the machine 14. At this point, the various electrical, hydraulic and plastic lines are connected to the injection molding unit 22 and the enclosure 24. If necessary, the handles 110,120 are manipulated to locate the proper x and y coordinates for the injector barrel 94. Then, the cylinders 82,84 are employed to lower the barrel 94 to the proper injection location relative to the die of the machine 14.

Another attractive feature of the present invention is the ability of the arrangement 10 to be used on other brands of molding machine 14. By simply removing the fasteners 60 from the base plate 48, a crane can be employed to transfer the arrangement 20 from one machine 14 to another.

It should be understood that the portable injection molding arrangement 10 can be readily supplied to the owner of a standard injection molding machine 14 to increase the versatility of the machine 14. The present invention has a universal or modular design which permits the arrangement 10 to be easily installed on any machine 14 regardless of its particular manufacture. As a result, mold changeover is made remarkably convenient and enables the molder to meet the changing demands of customers with superior quality and high production volumes. The present invention creates valuable multi-shot capabilities which can be used to sequence molding and thus overmold an array of plastic components with various colors, materials and properties for greater appearance and perceived value. In addition to consolidating several molding operations on one machine, multi-shot molding can be employed to eliminate assembly operations. For example, a rigid automotive housing can be molded with a soft gasket eliminating secondary handling and assembly.

Figure 5:
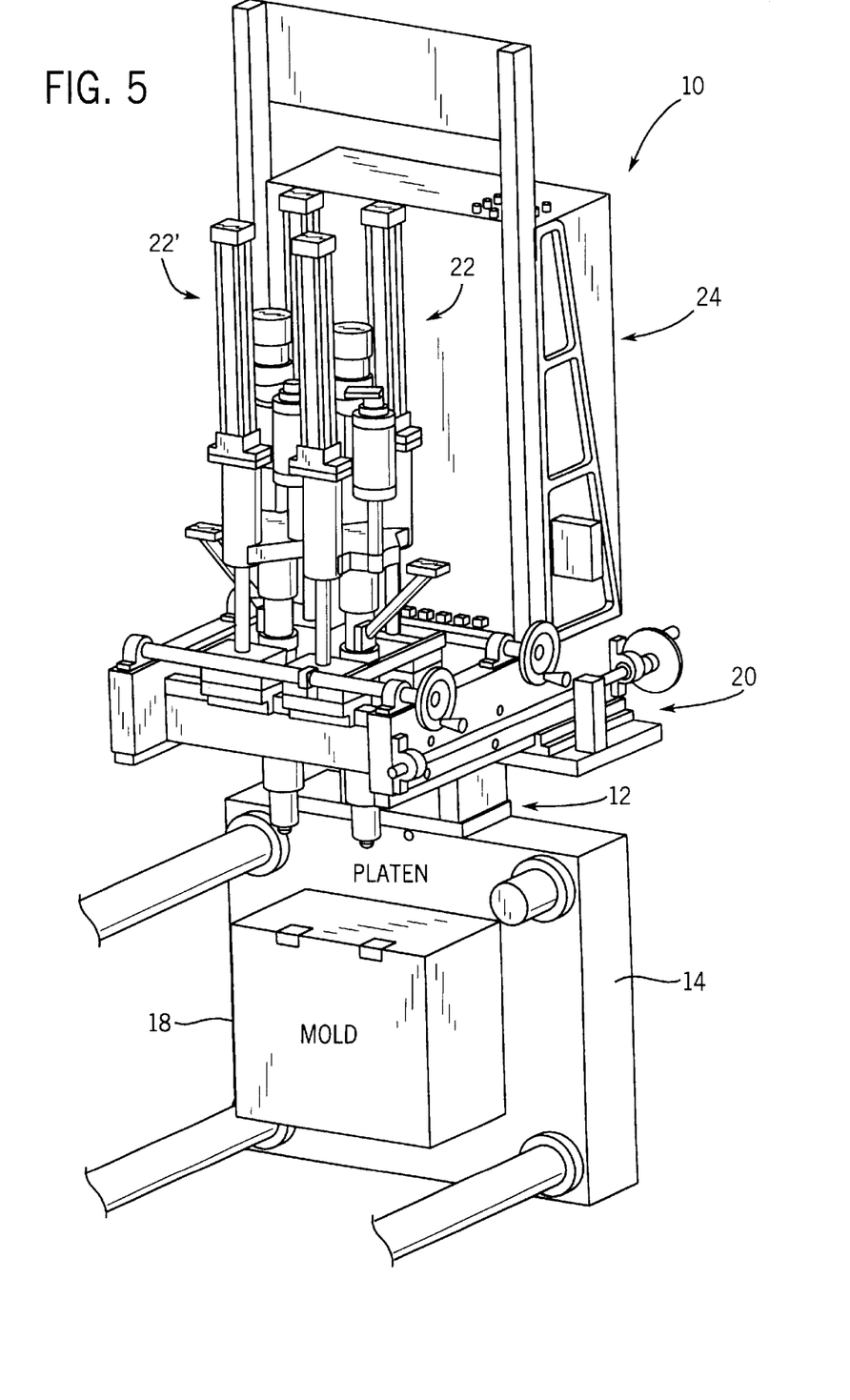
FIG. 5 is a view of a portable injection molding arrangement having two injection molding units mounted to the upper housing of the injection molding machine.
Figure 6:
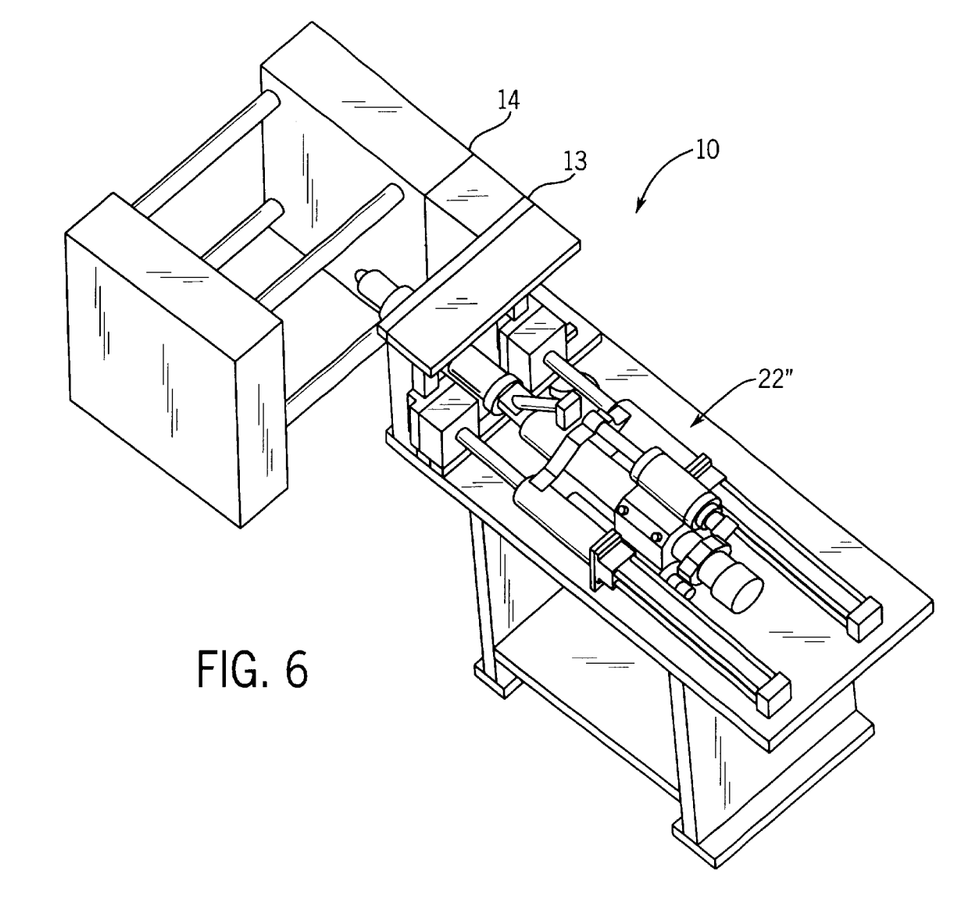
FIG. 6 is a view of a portable injection molding arrangement having an injection molding unit removably mounted to the side housing of the injection molding machine.

While the invention has been described with reference to a preferred embodiment, those skilled in the art will appreciate that certain substitutions, alterations, and omissions may be made without departing from the spirit thereof. For example, it should be understood that the invention further contemplates that a second injection molding unit 22' (FIG. 5) may be removably mounted to the upper housing portion 12 of the machine 14. In addition, an injection molding unit 22" can be removably mounted to another housing portion such as a side portion 13 of the machine 14, as shown in FIG. 6. In each adaptation, the additional injection molding unit is arranged to cooperate with the die 18 of the machine 14 to increase the productivity thereof. Accordingly, the foregoing description is meant to be exemplary only, and should not be deemed limitative on the scope of the invention set forth with the following claims.

We claim:

1. An injection molding apparatus comprising:
   a fixed, injection molding machine having a housing, a first injection molding unit and a die associated therewith; and
   a portable framework movably mounted to the molding machine housing and having at least a second injection molding unit operably aligned with the molding machine die and cooperable with the first injection molding unit,
   wherein the portable framework includes:
   a base plate fixed to the molding machine housing; and
   a frame slidably mounted on the base plate and interconnected by a cross member structure, the second injection molding unit being slidably mounted to the cross member structure.

2. The apparatus of claim 1, including a first adjustment device disposed between the frame and the base plate for enabling sliding movement of the frame, cross member structure and second injection molding unit relative to the base plate, and a second adjustment device disposed between the frame and the cross member structure for providing sliding movement of the second injection molding unit relative to the frame and base plate.

3. The apparatus of claim 2, wherein one of the adjustment devices provides movement longitudinally of the molding machine housing, and the other of the adjustment devices provides movement laterally of the molding machine housing.

4. The apparatus of claim 1, including a first set of linear bearings interposed between the frame and base plate.

5. The apparatus of claim 4, including a second set of linear bearings interposed between the cross member structure and a mounting block structure of the second injection molding unit.

6. The apparatus of claim 1, wherein the cross member structure has top portions defining a latitudinal set of rails.

7. The apparatus of claim 5, wherein the mounting block structure includes a pair of mounting blocks interconnected together by a tie bar.

8. The apparatus of claim 2, wherein the first adjustment device includes a longitudinal lead screw, and the second adjustment device includes a latitudinal lead screw.

9. The apparatus of claim 1, wherein the second injection molding unit has an injector barrel which is adjustable along three different axes of movement relative to the molding machine housing.

10. The apparatus of claim 2 wherein the first and second adjustment devices are lead screws and associated nuts.

11. The apparatus of claim 1 wherein the housing is an upper surface of a platen supporting the mold and wherein the base plate is fixed to the platen.

12. The apparatus of claim 11 wherein the second injection molding unit is aligned to be perpendicular with respect to the alignment of the first injection molding unit to extend downward vertically on the mold.

* * * * *